(12) United States Patent
Le Paih et al.

(10) Patent No.: US 9,877,491 B2
(45) Date of Patent: Jan. 30, 2018

(54) METHOD AND MACHINE FOR THE PRODUCTION OF PORTIONS, INCLUDING MEANS FOR EJECTING SAID PORTIONS

(71) Applicant: MAREL FRANCE, Baud (FR)

(72) Inventors: Jacques Le Paih, Plumeliau (FR); Adrianus Van Den Nieuwelaar, Gemert (NL); Sigebertus Meggelaars, Eindhoven (NL); Yohann Pierre, Kervignac (FR)

(73) Assignee: MAREL FRANCE, Baud (FR)

( * ) Notice: Subject to any disclaimer, the term of this patent is extended or adjusted under 35 U.S.C. 154(b) by 0 days.

(21) Appl. No.: 14/385,749

(22) PCT Filed: Mar. 20, 2013

(86) PCT No.: PCT/EP2013/055813
§ 371 (c)(1),
(2) Date: Sep. 16, 2014

(87) PCT Pub. No.: WO2013/139853
PCT Pub. Date: Sep. 26, 2013

(65) Prior Publication Data
US 2015/0072056 A1 Mar. 12, 2015

(30) Foreign Application Priority Data

Mar. 20, 2012 (FR) ...................... 12 52503

(51) Int. Cl.
*A22C 7/00* (2006.01)
*A23L 1/31* (2006.01)
(Continued)

(52) U.S. Cl.
CPC .......... *A22C 7/0015* (2013.01); *A21C 11/103* (2013.01); *A21C 11/16* (2013.01);
(Continued)

(58) Field of Classification Search
CPC ....... A22C 7/0015; A23L 1/0076; A23L 1/31; A23P 1/12; A23V 2002/00;
(Continued)

(56) References Cited

U.S. PATENT DOCUMENTS 3,535,735 A 10/1970 Egee
3,691,594 A 9/1972 Klein
(Continued)

FOREIGN PATENT DOCUMENTS

DE 3523359 A1 3/1986
EP 0360446 B1 3/1993
EP 0882402 A2 12/1998

*Primary Examiner* — Seyed Masoud Malekzadeh
(74) *Attorney, Agent, or Firm* — Zarley Law Firm, P.L.C.

(57) ABSTRACT

The invention relates to a method and a device for the production of portions from at least one continuous strand of a food product, in particular for the production of meatballs. The machine comprises: an extrusion device which can deliver a continuous strand in a vertical direction, and a portioning device that includes at least one cutting system. The cutting system comprises cutting elements (30) which can be moved transversely to the vertical direction between an open position, in which the strand passes between the cutting elements, and a closed position for cutting the strand and forming portions of the food product. In addition, each cutting system comprises ejection means (5) for ejecting the forming portions downwards from the cutting elements. The ejection means include at least one lower channel (5, 105) that is fluidly connected to a compressed fluid such that compressed fluid can be injected into the lower channel when the lower channel is in a closed position. The lower channel is formed in a body of the corresponding cutting element.

11 Claims, 10 Drawing Sheets

(51) Int. Cl.
*B29C 47/00* (2006.01)
*B65B 25/06* (2006.01)
*A21C 11/10* (2006.01)
*A21C 11/16* (2006.01)
A21C 5/08 (2006.01)
A21C 7/06 (2006.01)
B29L 31/00 (2006.01)

(52) U.S. Cl.
CPC ........ *B29C 47/0004* (2013.01); *B65B 25/065* (2013.01); *A21C 5/08* (2013.01); *A21C 7/06* (2013.01); *A23V 2002/00* (2013.01); *A23V 2300/16* (2013.01); *A23V 2300/31* (2013.01); *B29K 2089/00* (2013.01); *B29L 2031/70* (2013.01)

(58) Field of Classification Search
CPC   A23V 2300/16; A23V 2300/31; A21C 11/16; A21C 11/103; A21C 5/08; A21C 7/06
See application file for complete search history.

(56) References Cited

U.S. PATENT DOCUMENTS

| | | | |
|---|---|---|---|
| 4,257,145 A | 3/1981 | Bovino | |
| 6,439,092 B1 * | 8/2002 | Merritt | A21C 11/00 83/54 |

* cited by examiner

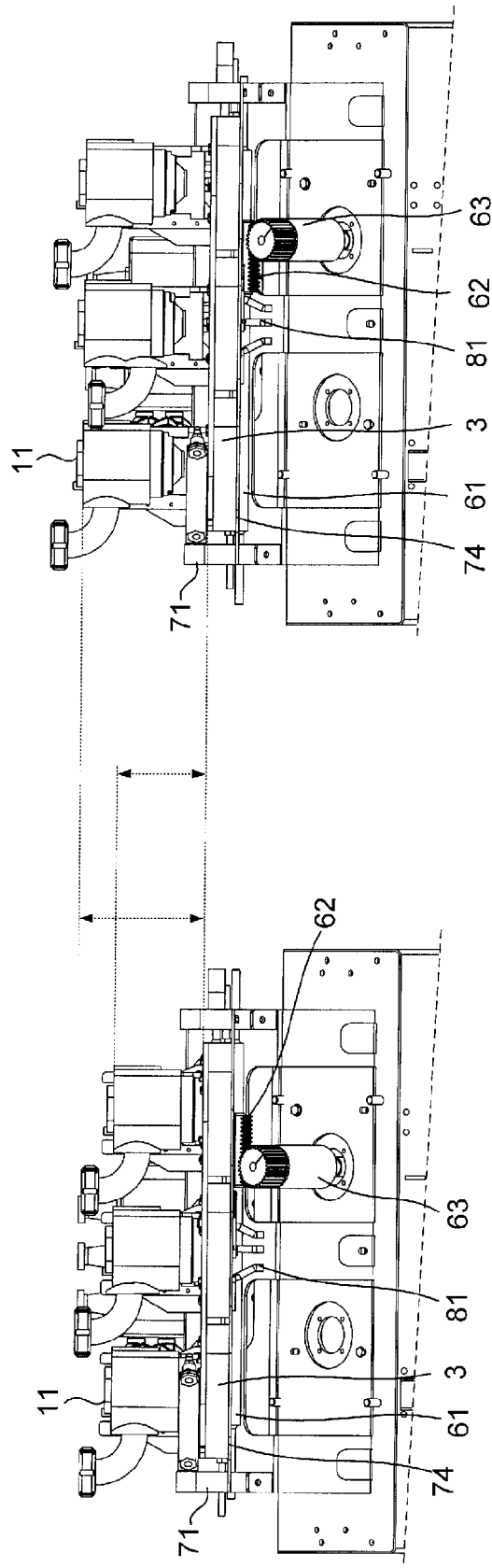

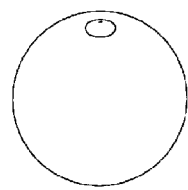
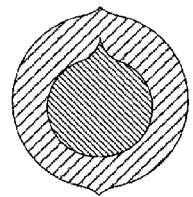
FIG. 17A        FIG. 17B
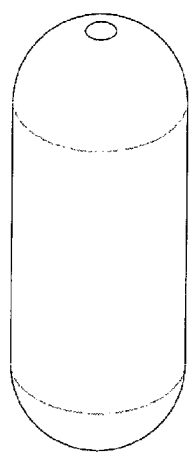
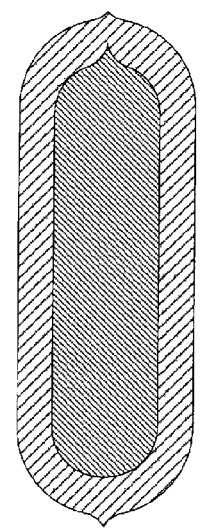
FIG. 18A        FIG. 18B
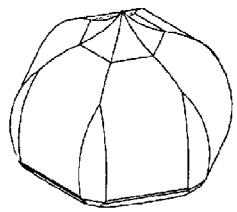
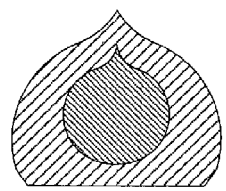
FIG. 19A        FIG. 19B

METHOD AND MACHINE FOR THE PRODUCTION OF PORTIONS, INCLUDING MEANS FOR EJECTING SAID PORTIONS

BACKGROUND OF THE INVENTION

The present invention relates to a method and device for the production of portions from at least one continuous strand of a food product, in particular for the production of meatballs, comprising a particular cutting system.

The prior art includes, in particular through the patent document EP 360 446, a machine for the production of spherical portions or balls, comprising an extrusion device comprising an extrusion head continuously delivering a continuous strand in a vertical direction, a portioning device comprising a cutting system, said cutting system comprising cutting elements suitable for being moved transversally to said vertical direction between an open position wherein the strand passes between said cutting elements and a closed position for cutting the strand and forming portions of the food product, and a retrieval device arranged below the portioning device for retrieving the portions.

The cutting system is of the diaphragm type, the cutting elements are mounted circumferentially in sliding contact with each other. The extrusion head is fixedly mounted above the cutting system, the latter being moved vertically according to a to-and-fro movement in order to cut the continuously fed strand. The retrieval device is in the form of an endless conveyor belt suitable for conveying trays in a feed direction, said conveyor being suitable for moving transversally to said feed direction in order to automatically position the balls in the trays. The cut balls drop gravitationally into the trays. The food product may tend to adhere to the cutting elements. The drop height may thus vary from one ball to another. The ball may further adhere to a cutting element, be deflected to the side thereby when the cutting position returns to the open position. These drop height variations and these adhesion phenomena, which vary according to the size of the portions and the nature of the food product, limit the production rate and do not guarantee precise positioning of the balls in the trays.

The aim of the present invention is that of providing a solution intended to remedy the abovementioned drawbacks, suitable for the production of portions from a strand at high production rates, while enabling automatic packaging of the portions in trays.

SUMMARY OF THE INVENTION

For this purpose, the present invention relates to a machine for the production of portions of a food product, in particular meatballs, comprising an extrusion device suitable for delivering, preferably continuously, a continuous strand in a vertical direction, a portioning device comprising at least one cutting system, said cutting system comprising cutting elements suitable for being moved transversally to said vertical direction between an open position wherein the strand passes between said cutting elements and a closed position for cutting the strand and forming portions of the food product, and preferably a retrieval device arranged below the portioning device for retrieving the portions, characterised in that each cutting system further comprises ejection means suitable for ejecting the portions downwards from said cutting elements.

According to the invention, the portioning device further comprises ejection means for ejecting the portions from the cutting elements at least when the latter are in the closed position. The portions no longer merely drop gravitationally, to the retrieval device. These ejection means limit or even prevent adhesion phenomena of the portions to the cutting elements. The ejection means enable a quicker transfer of the portions to the retrieval device, particularly to the packaging trays, thus increasing the production rate of the machine, particularly in the case of small portions. Furthermore, in the case of packaging portions such as meatballs directly in trays, this ejection of the portions enables superior portioning of the portions in the trays, in particular in the tray compartments.

According to one embodiment, the ejection means comprise a lower channel suitable for fluidic connection with a compressed fluid, in particular a compressed gas, and particularly compressed air, for injecting compressed fluid, at least when the cutting elements are in the closed position.

According to one embodiment, the ejection means comprise at least one lower channel formed in the body of a cutting element, said channel opening via a lower orifice onto a lower surface of said cutting element.

According to one embodiment, a plurality of the cutting elements of the cutting system, preferably all of said cutting elements, each comprise at least one lower channel, preferably a plurality of lower channels.

According to a further embodiment, the ejection means are of the mechanical type and comprise for example a push rod type member movably mounted in a recess of one or a plurality of cutting elements and suitable for moving between a retracted position wherein the outer active surface of the push rod forms a continuous surface with the lower surface of the cutting element and an extended position wherein the active surface projects in relation to the lower surface so as to eject the portion.

According to one embodiment, each cutting system comprises at least one upper injection channel formed in the body of a cutting element, said channel opening via an upper orifice onto an upper surface of said cutting element and being suitable for fluidic connection with a compressed fluid, in particular a compressed gas, and particularly compressed air, for injecting compressed fluid, at least when the cutting elements are in the closed position. This fluid injection makes it possible to limit or even prevent risks of the strand adhering to the upper surfaces of the cutting elements of the cutting system.

According to one embodiment, the cutting system comprises at least three cutting elements arranged circumferentially, and arranged in sliding contact with each other in order to form a central passage together, said cutting elements being suitable for being moved horizontally, transversally to the strand feed direction, between the open position and the closed position in order to progressively close and open said passage so as to form said portions.

According to one embodiment, said cutting elements comprise lower inclined surfaces, preferably concave, forming in the closed position a lower shaping cavity.

According to one embodiment, each lower channel opens via an orifice onto the inclined lower surface of a cutting element.

According to one embodiment, said cutting elements comprise upper inclined surfaces, preferably concave, forming in the closed position an upper shaping cavity, each upper channel preferably opens via an orifice onto the inclined upper surface of a cutting element.

According to one embodiment, the extrusion device comprises at least one extrusion head suitable for continuously delivering a continuous strand in a vertical direction, the extrusion head(s) are movably mounted vertically according to a to-and-fro movement between a low position and a high position, the to-and-fro movement of said extrusion heads and the movement of the cutting elements between the closed position thereof and the open position thereof being synchronised, such that the extrusion heads are in the low position when the cutting systems are in the open position, the movement speed of the heads from the low position to the high position being substantially equal to the extrusion speed of the strands.

The to-and-fro movement of the heads and the use of fixed cutting systems in the vertical position makes it possible to position the cutting elements as close as possible to the retrieval device and ensure a precise and reduced portion drop height.

According to one embodiment, the portioning device further comprises guiding means arranged under each cutting system in order to guide the vertical drop of each portion ejected from the cutting elements. These guiding means make it possible to position the portions more precisely in the trays, in particularly in the tray compartments.

According to one embodiment, the machine further comprises a retrieval device arranged below the portioning device to retrieve the portions, said retrieval device preferably comprises a conveyor suitable for receiving on the upper belt thereof trays for receiving portions, and conveying said trays in a feed direction.

According to one embodiment, the extrusion device comprises at least two extrusion heads, preferably at least three extrusion heads, each suitable for continuously delivering a continuous strand in a vertical direction, the main vertical axes of said extrusion heads are transversally offset from each other, in the transversal direction which is perpendicular to the conveyor feed direction, said portioning device comprising a cutting system associated with each extrusion head, centred in relation to the main axis of the extrusion head, said cutting systems being transversally offset from each other in the transversal direction which is perpendicular to the conveyor feed direction, such that each assembly formed from a head and a cutting system is used to form the portions of a row of portions in the trays.

For cutting system size reasons, and to ensure a small transversal gap between the meatballs in the trays, the main axes of the extrusion heads and the cutting systems thereof are preferably longitudinally offset from each other in the conveyor feed direction. According to one embodiment, said conveyor operates in step-by-step mode.

The present invention also relates to an assembly comprising a machine as defined above, and packaging trays, each tray comprising compartments arranged in rows for receiving the portions, said trays being arranged on the conveyor such that the rows of compartments are arranged longitudinally parallel to the conveyor feed direction, the compartments from the same row receiving portions cut by the same cutting system. Preferably, each tray comprises bosses suitable for guiding the portions to the compartments when dropping same.

The present invention also relates to a method for the production of portions of a food product, in particular meatballs, comprising a) producing at least one continuous strand of a food product, by freely hanging, substantially vertically, at least the end part of said strand, said end part preferably being fed continuously vertically, b) portioning said strand by cutting said hanging end part, by cutting elements, so as to form portions detached from the strand, characterised in that the portioning step comprises downward pushing of each cut portion, in order to eject the portions of said cutting elements, said portions being detached from the strand gravitationally and by this additional pushing operation, said downward pushing being preferably obtained by means of one or a plurality of fluid flows.

According to one embodiment, each cut and pushed portion is guided vertically downwards, by guiding means.

According to one embodiment, the cut and pushed portions are retrieved in order to be loaded into packaging trays.

According to one embodiment, each cut and pushed portion is retrieved in a packaging tray, preferably in a compartment of a tray including compartments, each compartment receiving a single portion.

According to one embodiment, the method comprises the production of a plurality of continuous strands of a food product, the end parts of said strands hanging freely, substantially vertically, offset in relation to each other perpendicular to a tray feed direction such that the portions are arranged in rows in the trays, the portions of the same row in a tray being obtained by cutting the same strand.

BRIEF DESCRIPTION OF THE DRAWINGS

The invention will be understood better, and further aims, details, features and advantages will emerge more clearly during the detailed explanatory description hereinafter of one currently preferred particular embodiment of the invention, with reference to the appended schematic figures wherein:

FIGS. 6A and 6B are two partial side views of the machine in FIG. 1 illustrating the extrusion heads, in the low position and in the high position, respectively;

FIGS. 17A and 17B are perspective and sectional views of a spherical portion suitable for being obtained with a machine according to the invention;

FIGS. 18A and 18B are perspective and sectional views of an elongated portion suitable for being obtained with a machine according to the invention; et, FIGS. 19A and 19B are perspective and sectional views of a further portion suitable for being obtained with a machine according to the invention.

DETAILED DESCRIPTION OF THE PREFERRED EMBODIMENTS

Figure 1:
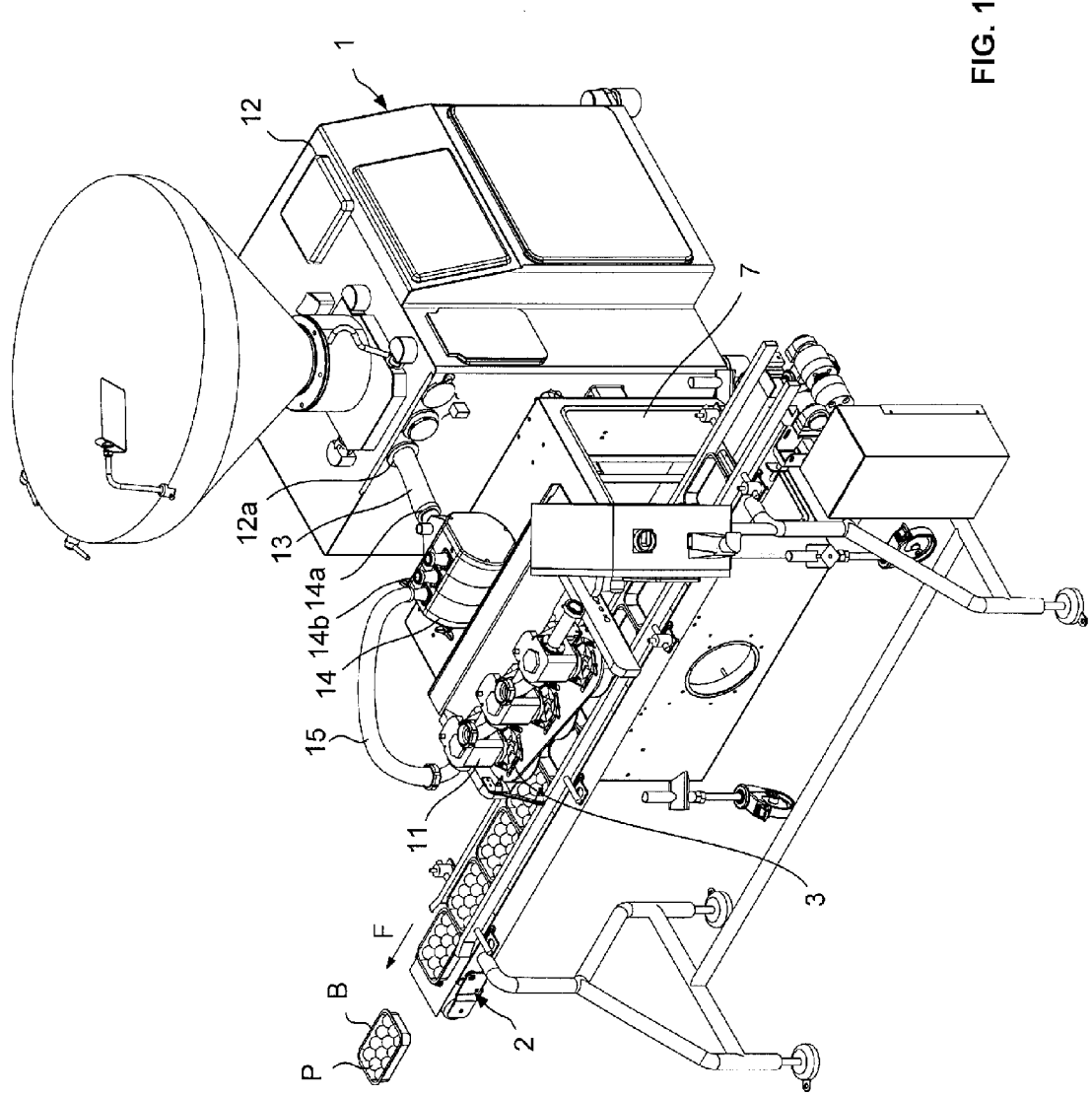
FIG. 1 is a perspective view of a machine for producing portions according to the invention.
Figure 2:
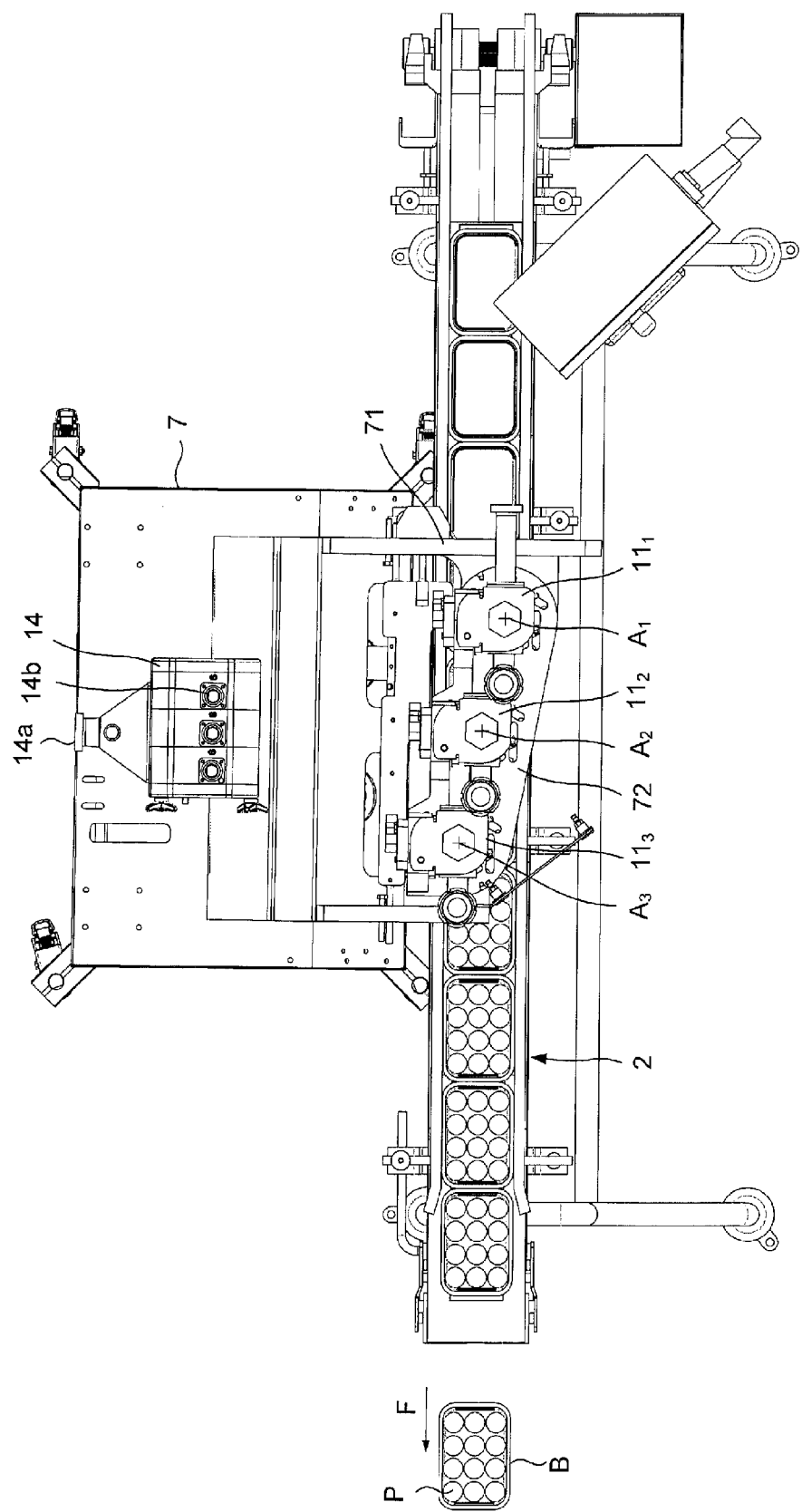
FIG. 2 is an enlarged top view of the machine in FIG. 1, without the extrusion device push rod.
Figure 3:
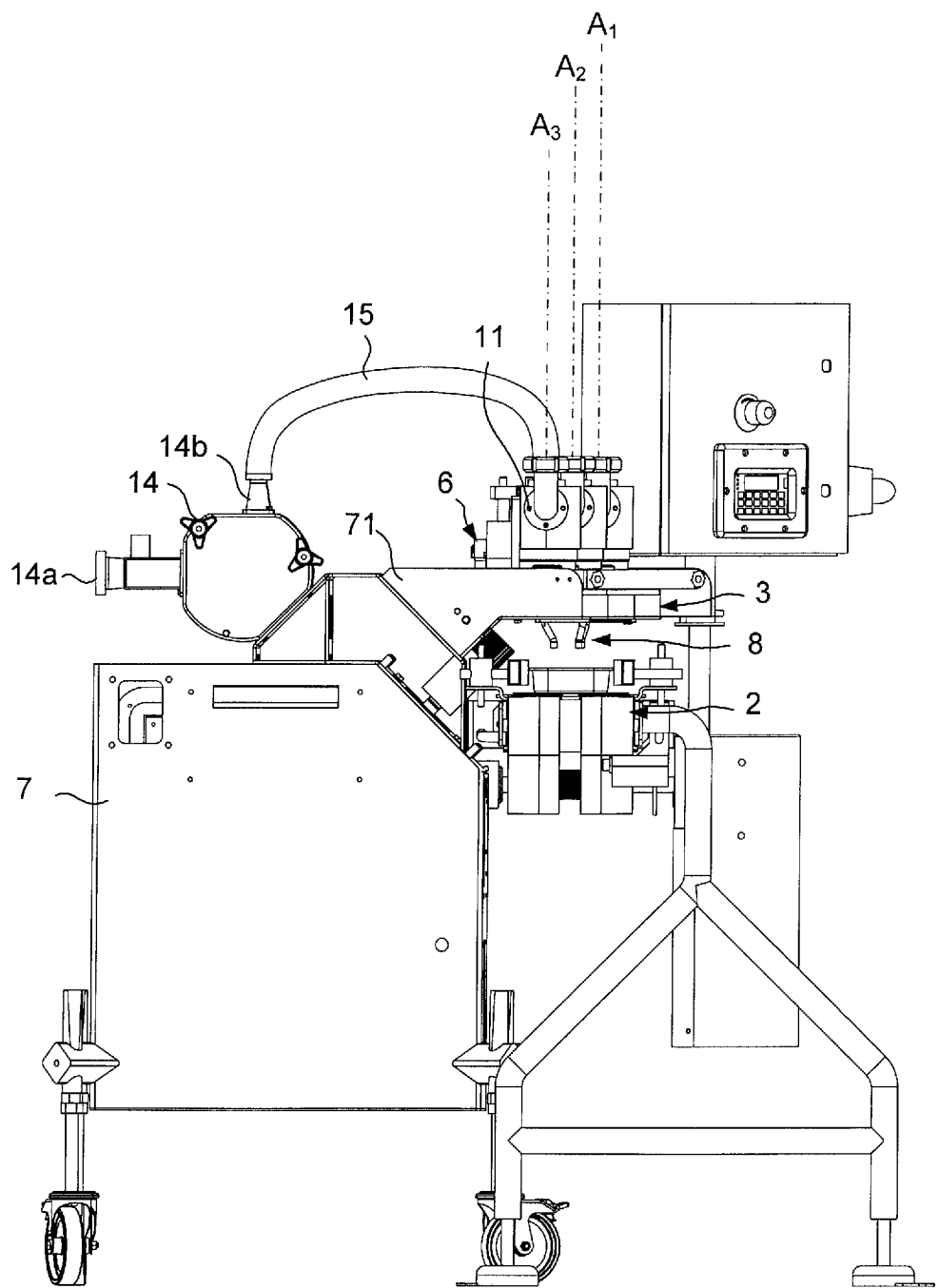
FIG. 3 is a side view of the machine in FIG. 2.

The machine illustrated in the figures is intended for the production of meatball type portions from three continuous strands, said machine enabling automatic packaging of the meatballs in trays. With reference to FIGS. 1, 2 and 3, the machine comprises an extrusion device 1, a portioning device and a retrieval device 2, also known as a packaging or tray packaging device. In the present embodiment, the extrusion device 1 comprises three extrusion heads or nozzles 11, individually referenced $11_1$, $11_2$, $11_3$, having a main vertical axis $A_1$, $A_2$, $A_3$ for the continuous extrusion of three cylindrical strands. The portioning device comprises three cutting systems 3, individually referenced $3_1$, $3_2$, $3_3$, one cutting system being arranged below each extrusion head. The packaging device comprises an endless conveyor belt arranged below the cutting systems and intended to convey on the upper belt thereof trays B in a substantially horizontal feed direction F.

Figure 4:
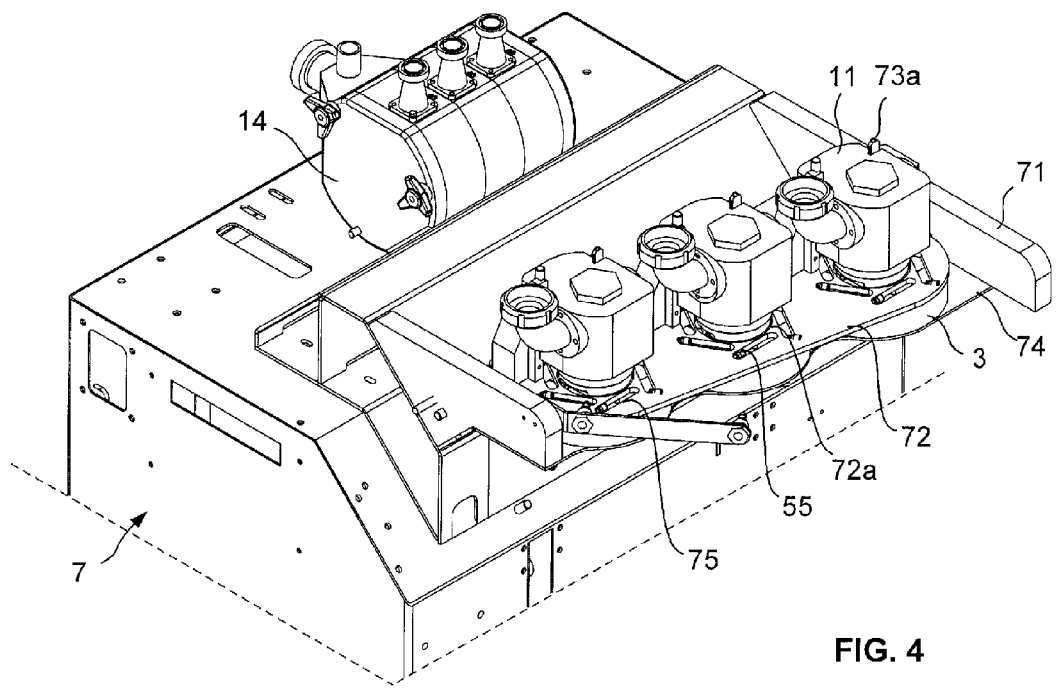
FIGS. 4 and 5 are two partial side views of the machine in FIG. 1, illustrating the extrusion heads and the cutting systems.
Figure 5:
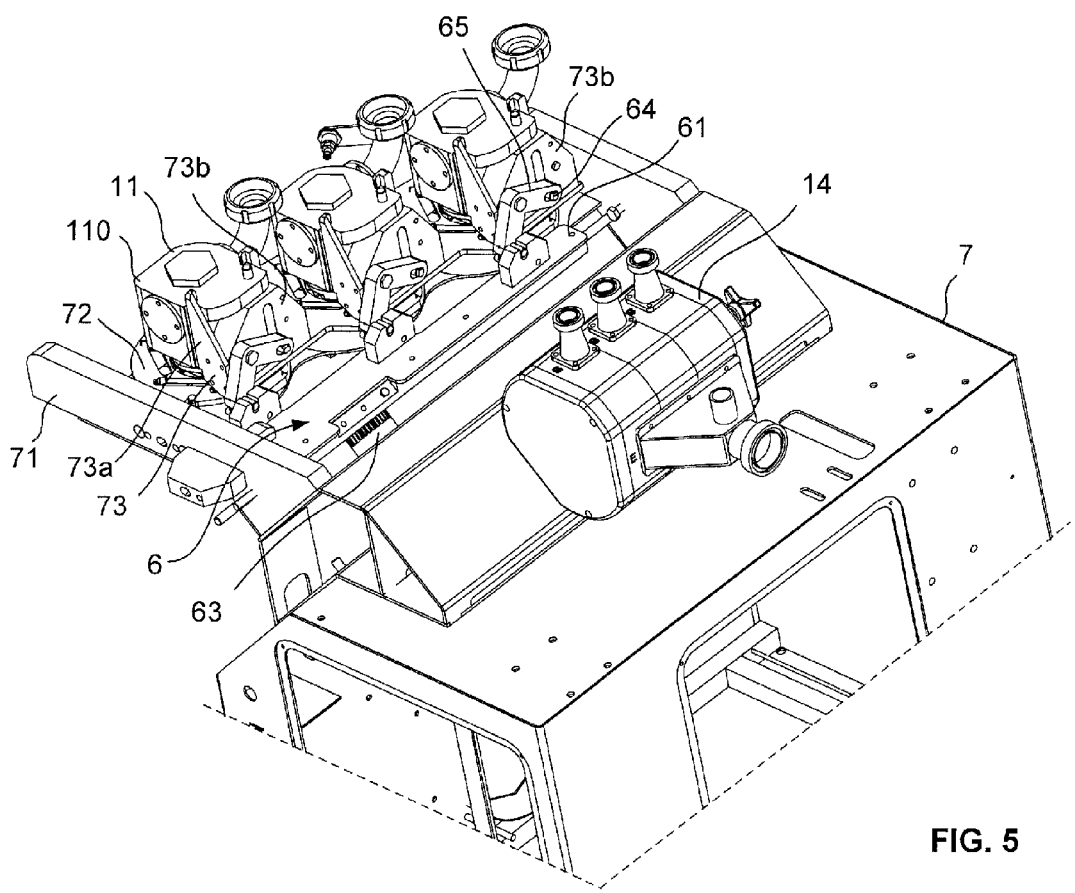

The extrusion device comprises a push rod 12, known per se, for delivering via an outlet 12a a continuous flow of a food product, for example a minced meat flow. The outlet 12a is connected by means of a tube 13, for example a flexible tube, to the inlet 14a of a distributor 14. The distributor, known per se, equally distributes to three outlets 14b the incoming flow of food product. The distributor is mounted on a support frame 7. An extrusion head 11 is connected to each outlet 14b by means of a flexible tube, represented schematically under the reference 15 in FIGS. 1 and 3 between an outlet of the distributor and the nozzle referenced $11_3$. The heads are movably mounted in vertical translation on the support frame, overhanging the conveyor. With reference to FIGS. 3, 4 and 5, the frame comprises two overhanging arms 71, between which an upper plate 72 is mounted. Each head is slidably mounted on a head support 73 assembled on the plate 72. The support 73 comprises two lateral vertical members 73a assembled on each side of a base 73b whereby the support is assembled with the plate. Said vertical members have ribs sliding in corresponding grooves of the head body 110. Each head is slidably mounted above a circular opening 72a of the plate. The heads are mounted such that the main axes $A_1$, $A_2$, $A_3$ thereof are offset from each other in the direction F, and the horizontal direction perpendicular to the direction F.

An actuating system 6 is suitable for simultaneously moving the three heads according to a vertical to-and-fro movement between a low position illustrated in FIG. 6A and a high position illustrated in FIG. 6B. This actuating system comprises an actuating bar 61 movably mounted in horizontal translation, parallel with the feed direction, between the two arms 71. The bar is provided with a rack 62 engaging with the pinion of a motor 63. Each head is provided with an actuating piece 64 arranged perpendicular to the direction F and sliding in a vertical slot of the base 73b of the head support. An L-shaped lever 65 is pivotally mounted on the base 73b about an axis perpendicular to the direction F. A first arm of the lever 65 has at the end an oblong slot wherein the pin 64 for actuating the head is inserted, and the second arm thereof is connected via a piece to the bar 61. The horizontal to-and-fro movement of the bar by the motor 63 triggers, via the levers, the vertical to-and-fro movement of the heads. The motor is suitable for being controlled to move the bar between the right position, illustrated in FIG. 6A wherein the heads are in a low position, and a left position, illustrated in FIG. 6B, wherein the heads are in the high position.

Each extrusion head 3 is associated with a cutting system 3 for cutting the continuous strand delivered by said head into portions. Each cutting system is a diaphragm type system, having a central passage closing and opening progressively. With reference to FIGS. 8 to 11, each cutting system 3 comprises in this case six cutting elements 30 mounted in sliding contact with each other in the recess 41 of a support housing 40. Each cutting element is formed from a body having a general hexahedral shape, comprising an upper surface 31 and a lower surface 32, mutually parallel and overall trapezoidal, and four vertical lateral surfaces. Of these four lateral surfaces, a first surface and a second surface which are adjacent, referred to as inner sliding surfaces 33, 34 join along an edge 35. A first outer surface 36 forms an edge with the second inner sliding surface 34 and extends parallel with the first inner sliding surface 33. The second outer surface 37, referred to as the outer sliding surface, forms an edge with the inner sliding surface, optionally via a chamfered edge 38.

The recess 41 has a hexagonal side wall 42 and a rear wall 43 provided with a through central circular opening 44. The cutting elements are mounted in the recess of the housing, each cutting element is in sliding contact via the lower surface 32 thereof against the rear wall 43 of the recess, and via the outer sliding surface 37 thereof against one face of the side wall 42. The cutting elements are in sliding contact with each other via the inner sliding surfaces 33, 34 thereof, each cutting element being in contact via the first inner sliding surface thereof with the second inner sliding surface of an adjacent element and via the second inner sliding surface thereof with the first inner sliding surface of the other adjacent element.

In a so-called open position of the cutting system, as illustrated in FIG. 6A, the cutting elements are in contact against the wall of the recess via the outer surfaces 36, 37 thereof, a central passage is formed by the exposed parts of the first inner sliding surfaces 33 of the cutting elements. The passage has in this open position a sufficient cross-section so that the extruded strand can pass, without contact with the cutting elements.

Figure 12:
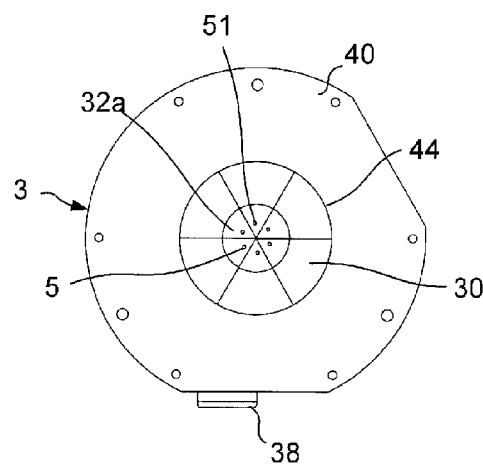
FIG. 12 is a bottom view of a cutting system in the closed position.

The sliding of the cutting elements along the faces of the side wall of the recess gives rise to a progressive reduction of the central passage until the closure of said passage in a so-called closed position of the cutting system, illustrated in FIGS. 6B and 12, wherein the cutting elements come substantially into contact with each other via the edge 35 thereof. The cutting system is maneuvered from the closed position to the open position by moving one of the cutting elements, referred to as the driving cutting element, along the side wall by means of an actuating piece 39 attached to the outer sliding surface, by means of screws screwed into an insert 30a, housed in a recess of said cutting element, said piece sliding in a slot 45 of the side wall of the recess of the housing. The sliding via the piece of said driving cutting element results in sliding of the other cutting elements.

In the present embodiment, each cutting element has a pointed shape towards the edge 35 thereof. The angle formed by the two inner sliding surfaces 33, 34 and the upper surface 31 is cut to form an upper inclined surface 31a. Similarly, the angle formed by the two inner sliding surfaces 33, 34 and the lower surface 32 is cut to form a lower inclined surface 32a. These lower and upper inclined surfaces have a concave shape in this instance, such that in the closed position, the lower inclined surfaces form a lower cavity with a semi-spherical surface or a spherical segment surface, and the upper inclined form a cavity with a semi-spherical surface or a spherical segment surface. Each cutting element thus has an edge 35 having a reduced height in relation to the height of the cutting element which is defined between the upper surface and the lower surface. These cutting elements with a pointed portion enable more progressive clamping of the strand at the end of closure of the central passage and shaping of the portions.

The cutting systems 3 are assembled with the upper plate 72, against the lower surface thereof. For the assembly thereof, the cutting systems are mounted for example by means of screws between the upper plate and a lower plate 74, the whole being attached to the arms via the lower plate. Each cutting system is centred in relation to the main axis of a head, an opening 72a of the upper plate, and an opening of the lower plate. The cutting systems 3 and the heads 11 are moved in synchronicity, such that the cutting systems are in the open position when the heads are in the low position, and in the closed position when the heads are in the high position. The cutting systems are in this instance moved between the two positions thereof by means of the actuating system 6 used for moving the heads, the pieces 39 of the driving cutting elements of the three cutting systems being assembled with the actuating bar 61 mentioned above.

Figure 7B:
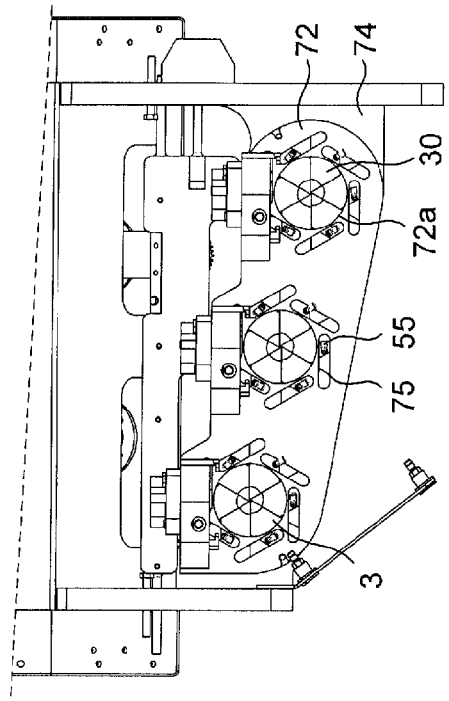
FIGS. 7A and 7B are two top views of the cutting systems of the machine in FIG. 1, in the open position and in the closed position respectively, in the absence of the heads and the upper support plate in FIG. 7A, and in the absence of the heads in FIG. 7B.

According to the invention, each cutting system further comprises ejection means for ejecting the portions downwards when the cutting systems are in the closed position. These ejection means are in this instance pneumatic, and comprise injection channels 5 or lower channels formed in the cutting elements. With reference to FIGS. 9 to 12, each cutting element comprises a channel 5 opening via a lower orifice 51 onto the concave lower inclined surface 32a and opening via a connection orifice 52 onto the upper surface 31. The channel comprises a first segment 53 extending from the connection orifice 52, perpendicular to the upper surface, and extended by a second segment 54 to the lower inclined surface. With reference in particular to FIGS. 4 and 7B, the connection orifice is connected to an air injection system (not shown) by a flexible tube (not shown), this connection being made by means of a connector 55 (FIG. 4). To enable the movement of the cutting elements, the upper plate is provided with slots 75 wherein the connectors slide.

The air injection system is suitable for injecting air into said channels 5, via the flexible tubes, when the cutting systems are in the closed position, to form an air flow from the lower orifices. According to one embodiment, this air injection commences immediately before the cutting systems have reached the closed position thereof, and is discontinued immediately after the cutting systems have started to return to the open position thereof.

In the present embodiment, said second segment 54 is inclined and forms an angle that is different to zero in relation to the horizontal, such that the air flow from the channel is directed downwards, the segment forming for example an angle of approximately 10° in relation to the horizontal.

Figure 7A:
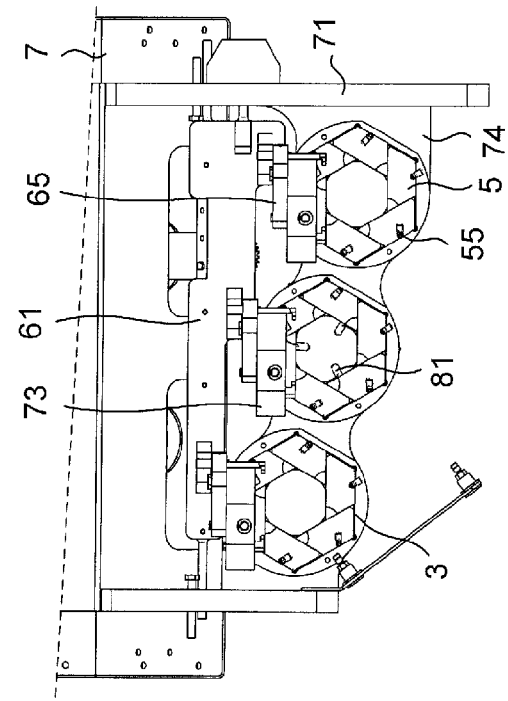
Figure 8:
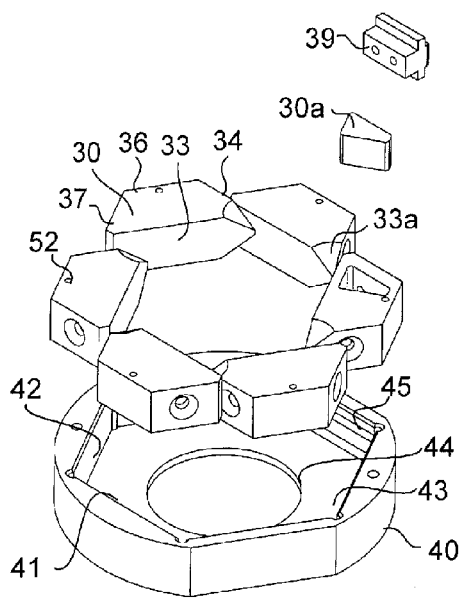
FIG. 8 is an exploded view of the various constituent elements of a cutting system.
Figure 9:
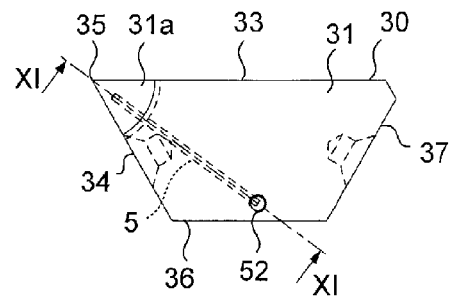
FIGS. 9 and 10 are respectively an enlarged top view and a perspective view of a cutting element of the cutting system in FIG. 8.
Figure 10:
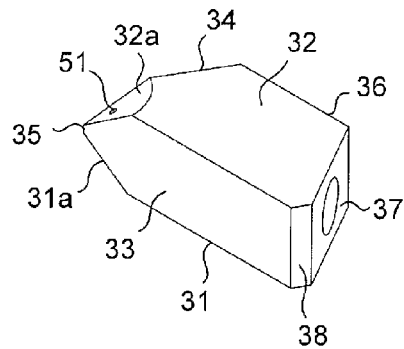
Figure 11:
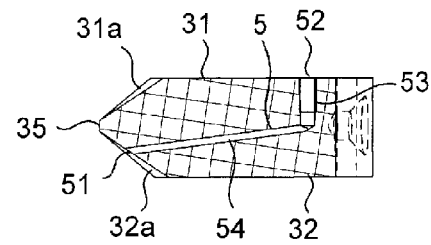
FIG. 11 is a sectional view along the plane XI-XI in FIG. 9.

A guiding system is further provided under each cutting system to guide the portions on the dropping thereof. FIGS. 3, 6A and 7A illustrate a guiding system 8 associated with a cutting system. This guiding system comprises cylindrical rods 81, for example three in number, extending downwards from the cutting system while moving same closer to each other to form together a passage centred along the main axis of the head associated with the cutting system, and wherein the cross-section decreases from top to bottom. The rods are arranged at regular angular intervals and comprise an inclined segment extending from the cutting system while approaching the main axis and a vertical segment parallel with the main axis, the cross-section of the passage at these segments corresponding substantially to the cross-section at the strand diameter.

The conveyor 2 comprises an endless belt, on the upper belt whereof trays are positioned, in succession. In the present embodiment, the trays comprise three rows of meatballs, the rows being parallel with the feed direction. Each cutting system associated with an extrusion head forms the meatballs for one row of the tray.

Preferably, the trays are trays including compartments, each compartment being intended to receive one meatball. The tray has bosses separating the compartments from each other, said bosses serving to guide the meatballs towards the compartments on the dropping thereof and also for holding the meatballs in the compartments when the trays are put on sale, after sealing, in an inclined position at substantially 45°.

In operation, each head extrudes a strand of a food product continuously in the vertical direction.

The heads being in the low position, and the cutting systems in the open position, the strands pass through the central passage of the cutting systems and extend beyond said cutting systems. The cutting systems are moved by the actuating system 6 towards the closed position thereof in order to progressively clamp the strands. Simultaneously, the heads are moved towards the high position thereof such that the feed rate of the strand in contact with the cutting systems is zero. Just before the cutting systems reach the closed position thereof, air is injected into the lower channels. The meatballs formed are thus ejected from the lower cavities. The meatballs ejected from the cutting systems are guided by the guiding systems 8 into the empty compartments of the trays. The cutting systems are moved to the open position thereof and simultaneously the heads are returned to the low position, in order to pass the strands through the central passages such that they extend below the cutting systems to form the next meatballs. Simultaneously, the trays are moved forward by one step by the conveyor to position the next empty compartments of the rows to be filled in the trays below the cutting systems. Air injection into the channels is preferably stopped during this movement of the cutting systems from the closed position to the open position.

Figure 13:
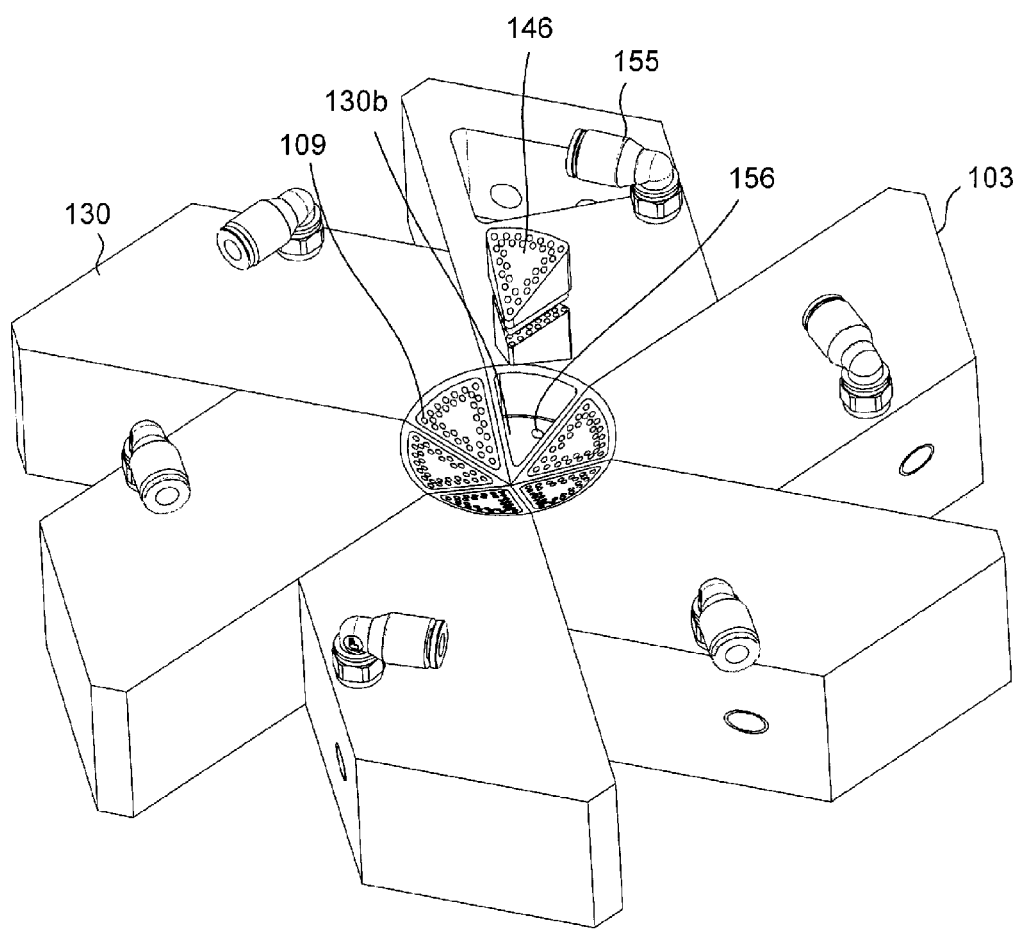
FIG. 13 is a perspective view of the cutting elements of a cutting system according to one alternative embodiment.
Figure 14:
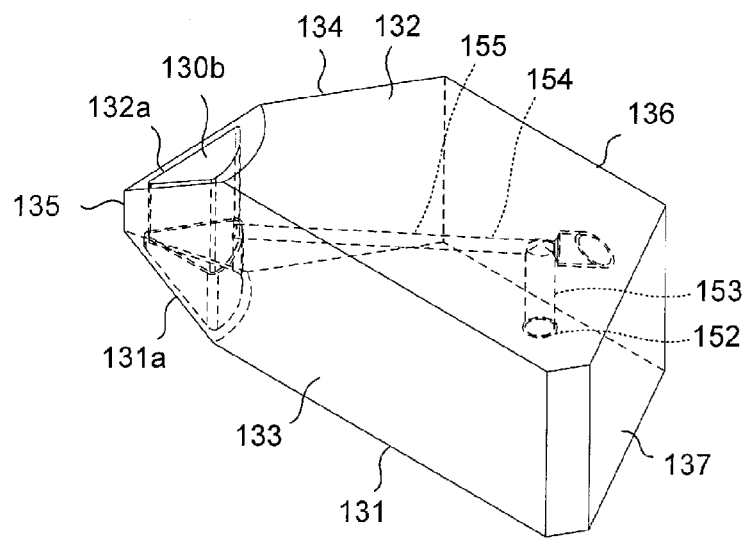
FIG. 14 is an enlarged perspective view of a cutting element in FIG. 13, in the absence of the insert forming the lower channels and the upper channels.
Figure 15:
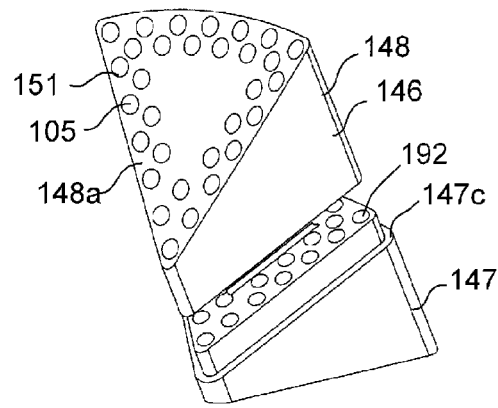
FIGS. 15 and 16 are respectively a perspective and side view of an insert of a cutting element in FIG. 14.
Figure 16:
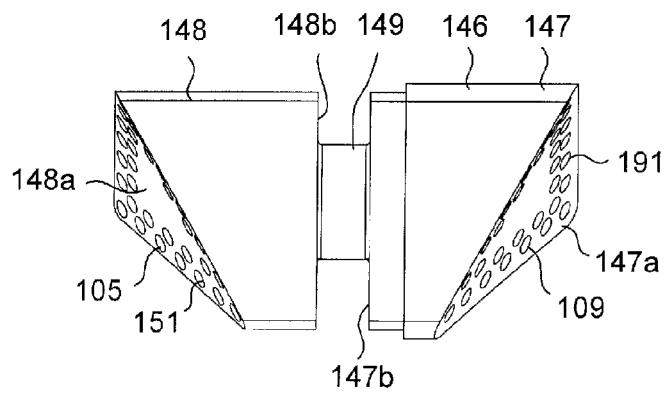

FIG. 13 illustrates the cutting elements 130 of a cutting system 103 according to one alternative embodiment, suitable for use in the machine described above instead of the cutting systems 3. As above, the cutting system 103 comprises cutting elements 130 mounted in sliding contact with each other in the recess of the support housing (not shown).

With reference to FIGS. 13 to 16, each element is formed from a body having a general hexahedral shape, comprising an upper surface 131 and a lower surface 132, a first inner sliding surface 133 and second inner sliding surface 134 joined along an edge 135, a first outer surface 136, and a second outer sliding surface 137. Each cutting element also has a concave upper inclined surface 131a and a concave lower inclined surface 132a. The cutting system is maneuvered between the closed position thereof and the open position thereof via a driving cutting element, as above.

Each cutting element comprises in this instance a plurality of so-called lower injection channels 105, opening via lower orifices 151 onto the lower inclined surface 132a for ejecting the portions, and a plurality of so-called upper injection channels 109 opening via upper orifices 191 onto the upper inclined surface 131a in order to form an air cushion at said upper inclined surface and prevent the strand from adhering to said surface, particularly on opening the central passage.

The upper 109 and lower 105 channels are formed in an insert 146 housed in a recess 130b opening onto the upper inclined surface 131a and onto the lower inclined surface 132a. The insert 146 comprises an upper part 147, having a concave outer surface 147a and an inner surface 174b, a lower part 148 having a concave outer surface 148a and an inner surface 148b, and a central part 149 connecting the upper part and the lower part together via the inner surfaces 147b, 148b thereof. The upper channels 109 are formed in the upper part 147, and open onto the inner surface 147a thereof via orifices 192 and onto the outer surface 147a via the upper orifices 191. The lower channels 105 are formed in the lower part 148, opening onto the inner surface 148b thereof via orifices (not shown), and onto the outer surface 148a thereof via the lower orifices 191. When the insert 146 is housed in the recess 130b thereof, the outer surfaces 147a, 148a of the upper and lower parts form a continuous concave surface respectively with the upper inclined surface 131a and the lower inclined surface 132a, and the upper and lower channels are arranged perpendicular to the upper and lower surfaces of the cutting element. For the vertical hold of the insert, the upper part 147 comprises a shoulder 147c bearing against a shoulder of the recess 130b.

These upper and lower channels are supplied with air by the same so-called main channel 155. The main channel 155 opens via a connection orifice 152 on the upper surface and via an orifice 156 (FIG. 13) in the recess 130b, said orifice being arranged between the inner surfaces 147b, 148b of the insert. The main channel comprises a first segment 153 extending from the connection orifice 152, perpendicular to the upper surface, and extended by a second segment 154 to the recess 130b. The connection orifice is equipped with a connector 155 for the connection thereof to an air injection system by means of a flexible tube.

Once mounted in the housing thereof, the cutting elements have lower 105 and upper 109 channels arranged vertically, for respectively creating downward vertical air flows for ejecting the portions and upward vertical air flows for preventing the strand from adhering to the cutting elements.

The air injection system is suitable for injecting air into said lower and upper channels, via the main channel, when the cutting systems are in the closed position. The air injection commences immediately before the cutting systems have reached the closed position thereof, and is discontinued immediately after the cutting systems have started to return to the open position thereof.

According to one alternative embodiment, the insert 146 provided with upper and lower channels is replaced by an insert made of porous material, for example made of plastic or sintered metal, in particular sintered stainless steel, allowing fluid to pass.

Although the invention has been described in relation to one particular embodiment, it is obvious that it is in no way restricted and that it includes any technical equivalents of the means described and the combinations thereof if they fall within the scope of the invention.

The machine according to the invention may also be used for the production of filled portions comprising an outer layer of a main material encompassing an inner layer of a filling material, the extrusion heads comprising two inlets for the coextrusion of the main material and the filling material. In the embodiment illustrated, the extrusion heads comprise a side inlet, and a central inlet sealed in this instance by a cap. For coextrusion, the cap is removed and a conduit is mounted in the main passage of the head body. The side inlet is fed as above by the push rod 12 and the distributor 14, with the main material. The conduit is fed with filling material via a second push rod associated with a second distributor. The connection of the conduit to an outlet of the distributor is also performed by means of a flexible conduit to enable the movement of the extrusion heads vertically to-and-fro. FIGS. 17A and 17B illustrate such a spherical filled portion, or filled ball, obtained with coextrusion heads, and cutting systems illustrated in the figures. FIGS. 18A and 18B illustrate an elongated filled portion that may also be obtained using the cutting systems illustrated in the figures, timing for example the return of the coextrusion heads to the high position thereof when they are in the low position, so as to obtain longer portions. FIGS. 19A and 19B illustrate a filled portion suitable for being obtained with cutting systems comprising cutting elements wherein the lower inclined portions form a lower cavity of a different shape to that illustrated in the figures, and with no upper inclined portions.

What is claimed is:

1. Machine for the production of portions of a food product, comprising:
    an extrusion device (1) suitable for delivering, continuously, a continuous strand in a vertical direction,
    a portioning device comprising at least one cutting system (3, 103), said at least one cutting system comprising cutting elements (30, 130) suitable for being moved transversally to said vertical direction between an open position wherein the strand passes between said cutting elements and a closed position for cutting the strand and forming portions (P) of the food product, each cutting system further comprising ejection means (5, 105) suitable for ejecting the forming portions (P) downwards from said cutting elements, the ejection means comprise at least one lower channel (5, 105) fluidly connected to a compressed fluid source, for injecting compressed fluid into the at least one lower channel when the cutting elements are in the closed position, wherein the at least one lower channel (5, 105) is formed in a body of corresponding cutting elements (30, 130), said at least one lower channel opens via a lower orifice (51, 151) onto a concave lower surface (32a, 132a) of said corresponding cutting element.

2. Machine according to claim 1, characterised in that said at least one cutting system comprises at least one upper injection channel (109) formed in the body of the corresponding cutting element (130), said at least one lower channel opens via an upper orifice (191) onto an upper surface (131a) of said corresponding cutting element and being suitable for fluidic connection with a compressed fluid, for injecting compressed fluid via said upper orifice.

3. Machine according to claim 1, characterised in that the cutting system (3, 103) comprises at least three cutting elements (30, 130) arranged circumferentially, and arranged in sliding contact with each other in order to form a central passage together, said cutting elements being suitable for being moved horizontally, between the open position and the closed position in order to progressively close and open said central passage so as to form said portions.

4. Machine according to claim 3, characterised in that said cutting elements (30, 130) each comprise the lower inclined surface (32a), forming in the closed position a lower shaping cavity.

5. Machine according to claim 1, characterised in that the at least one lower channel (5, 105) opens via the orifice (51, 151) onto the inclined lower surface (32a, 132a) of a cutting element.

6. Machine according to claim 2, characterised in that the cutting elements comprise upper inclined surfaces (51a, 151a), forming in the closed position an upper shaping cavity, each upper channel (109) opens via an upper orifice (191) onto the inclined upper surface (131a) of each cutting element.

7. Machine according to claim 1, characterised in that the extrusion device comprises at least one extrusion head (11) suitable for continuously delivering a continuous strand in said vertical direction, the at least one extrusion head is movably mounted vertically according to a to-and-fro movement between a low position and a high position, the to-and-fro movement of said at least one extrusion heads and movement of the cutting elements between the closed position thereof and the open position thereof being synchronised, such that the at least one extrusion head is in a low position when the at least one cutting system is in the open position.

8. Machine according to claim 1, characterised in that the portioning device further comprises guiding means (8) arranged under each cutting system (3, 103) in order to guide a vertical drop of each portion ejected from the at least one cutting elements.

9. Machine according to claim 1, characterised in that it further comprises a retrieval device (2) arranged below the portioning device to retrieve the forming portions, said retrieval device comprises a conveyor suitable for receiving on the upper belt thereof trays (B) for receiving portions, and conveying said trays in a feed direction (F).

10. Machine according to claim 9, characterised in that the extrusion device comprises at least two extrusion heads (11) suitable for continuously delivering a continuous strand in vertical direction, main vertical axes ($A_1, A_2, A_3$) of said extrusion heads are transversally offset from each other, in the transversal direction which is perpendicular to the feed direction (F) of the conveyor (2), said portioning device comprising at least one cutting system (3, 130) associated with each extrusion head, said at least one cutting systems being transversally offset from each other in the transversal direction perpendicular to the conveyor feed direction.

11. Machine according to claim 10, characterised in that main axes ($A_1, A_2, A_3$) of the extrusion heads (11) and the associated cutting systems (3, 130) thereof are longitudinally offset from each other in the conveyor feed direction (F).

* * * * *